United States Patent
Norrie

[11] Patent Number: 6,049,434
[45] Date of Patent: Apr. 11, 2000

[54] AFOCAL TELESCOPES

[75] Inventor: David Gordon Norrie, Denbigh, United Kingdom

[73] Assignee: Pilkington PE Limited, Wales, United Kingdom

[21] Appl. No.: 09/304,171

[22] Filed: May 3, 1999

[30] Foreign Application Priority Data

May 8, 1998 [GB] United Kingdom ............... 9809739

[51] Int. Cl.⁷ .......................... G02B 13/00; G02B 13/14; G02B 23/00
[52] U.S. Cl. .................... 359/744; 359/356; 359/362; 359/399
[58] Field of Search ................. 359/350, 355–357, 359/362, 399, 744

[56] References Cited

U.S. PATENT DOCUMENTS

| | | | |
|---|---|---|---|
| 4,398,786 | 8/1983 | Neil | 359/356 |
| 4,479,695 | 10/1984 | Neil | 359/744 |
| 5,044,706 | 9/1991 | Chen | 359/357 |
| 5,251,063 | 10/1993 | Baumann | 359/355 |
| 5,838,489 | 11/1998 | Erdmann | 359/357 |
| 5,880,879 | 3/1999 | Foo | 359/356 |

FOREIGN PATENT DOCUMENTS 2519961  11/1975  Germany ................. 359/356

*Primary Examiner*—Thong Nguyen
*Attorney, Agent, or Firm*—Alston & Bird LLP

[57] ABSTRACT

An afocal telescope operating in the thermal infra-red waveband has a three-element objective comprising a positively-powered central lens element disposed between positively powered and negatively powered lateral lens elements, the positively powered lateral lens element being located proximal to the inter-mediate image and incorporating a hybrid surface simultaneously to correct longitudinal and field colour, and wherein one of the positively powered lens elements of the objective is made of a material having a negative temperature refractive index co-efficient and has an optical power selected to render the telescope athermal.

6 Claims, 3 Drawing Sheets

AFOCAL TELESCOPES

FIELD OF THE INVENTION

Afocal telescopes capable of operating in the thermal infra-red waveband are already known for the purpose of interfacing a scanning system with object space. Such telescopes may have magnifications of greater than unity or less than unity depending upon particular applications and in the event that they are likely to be used under variable temperature conditions it is desirable to athermalize the telescope. Furthermore it is desirable that the telescope has good imaging quality for all points in the field of view such that the optical performance approaches the maximum permitted by diffraction limiting for both axial rays and off-axis rays.

BACKGROUND OF THE INVENTION

It is an object of the present invention to provide a new and improved form of afocal telescope capable of operating in the thermal infra-red waveband.

OBJECT AND SUMMARY OF THE INVENTION

According to the present invention there is provided an afocal telescope capable of operating in the thermal infra-red waveband, the telescope comprising a two-element eyepiece and a three-element objective, the eyepiece and objective being aligned on a common optical axis and arranged such that an intermediate image is formed between the objective and the eyepiece, wherein the three-element objective comprises a positively-powered central lens element disposed between positively powered and negatively powered lateral lens elements, the positively powered lateral lens element being located proximal to the inter-mediate image and incorporating a hybrid surface simultaneously to correct longitudinal and field colour, and wherein one of the positively powered lens elements of the objective is made of a material having a negative temperature refractive index co-efficient and has an optical power selected to render the telescope athermal.

Preferably the negative temperature refractive index co-efficient lens element is the central lens element of the objective, the refractive surfaces of which are preferably spherical to simplify manufacture.

The hybrid surface may be on either surface of the pertaining lens element and, of course, comprises a surface relief hologram diamond cut into the refractive surface.

Preferably also the positively powered lateral lens element incorporating the hybrid surface is made of any one of the materials: zinc selenide, germanium and chalcognenide.

It will be understood that materials having a negative temperature refractive index co-efficient have a refractive index which reduces in value as temperature increases. The preferred such material is Thallium Bromo-Iodide which is also known as KRS5. The materials of the remaining lens elements of the telescope of course have a positive temperature refractive index co-efficient (as is typical for infra-red transmitting materials).

The lens elements of the eyepiece may be made of Germanium or Gallium Arsenide.

By virtue of the present invention there is provided an afocal telescope capable of operating in the 8–12 micron thermal infra-red waveband, which is athermal in a passive manner, (i.e., without utilizing movable components), and which has good imaging quality over the entire field of view.

BRIEF DESCRIPTION OF THE INVENTION

An embodiment of the present invention will now be described by way of example with reference to the accompanying drawings, in which:

FIG. 1 schematically illustrates an afocal telescope in accordance with the present invention;

DETAILED DESCRIPTION OF THE INVENTION

Figure 1:
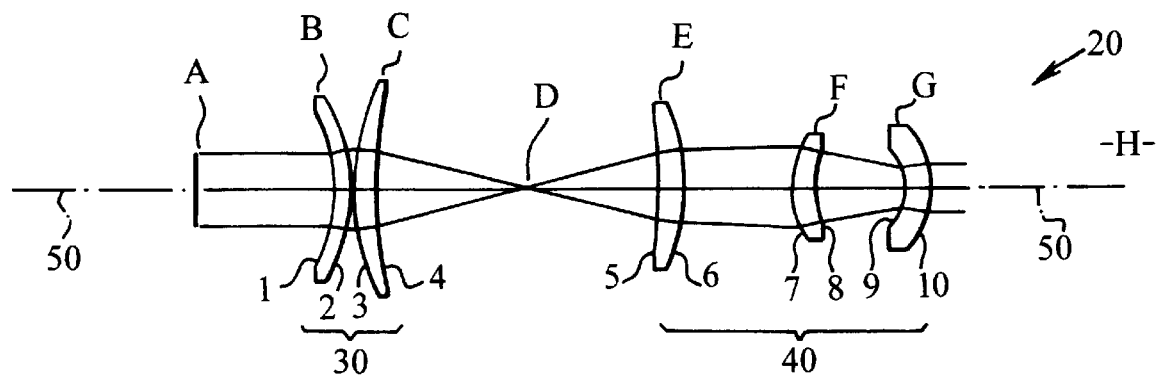

As is shown in FIG. 1 an afocal telescope 20 comprises and eyepiece 30 and an objective 40 aligned on a common optical axis 50 and arranged to form an intermediate image D from radiation emanating from object space H, and delivering image forming radiation to an exit pupil A where a scanning system (not shown) may be located.

The eyepiece 30 has two refractive elements B, C which are thin menisci-shaped lenses (with refractive surfaces 1, 2, 3 and 4) to provide for low narcissus effect and to provide correction for distortion and astigmatism.

The objective 40 has three refractive elements E, F and G, elements E and F being positively powered and element G being negatively powered. Element E (with refractive surfaces 5 and 6) is proximal to the intermediate image D and incorporates an aspheric hybrid surface as will be explained for the purpose of correcting spherical and chromatic aberrations, i.e., longitudinal and field colour. Both longitudinal and transverse chromatic aberrations are corrected due to the proximity of lens E to intermediate image D. Lens elements E and G are laterally disposed relative to element F.

Lens F which is the central lens of the three element objective 40 has refractive surfaces 7 and 8 and is made of a negative temperature refractive index coefficient material such as KRS5 whilst the remaining lenses B, C, E and G are each made of a positive temperature refractive index coefficient material so that by selecting the power of lens F the entire telescope 20 is athermalized in a static or passive manner and without moving parts.

Lens G has refractive surfaces 9 and 10 with comparatively small radius of curvature which correct field curvature. Also the image of the exit pupil A is designed to lie between lenses F and G.

A specific example of telescope 20 is numerically set forth in Table I where all dimensions are in millimeters; CC indicates concave; CX indicates convex; SPH indicates spherical; ASPH.A-1 indicates aspherical according to for mula A-1; HYB.X-1 indicates a surface relief hologram formed on an aspherical surface according to formula X-1; 'separation' indicates distance from the previous surface reading sequentially from left to right in FIG. 1; and 'aperture' indicates diametrical size.

Surface 6 on lens E is the hybrid surface comprising a surface-relief hologram designed according to a phase function having a construction wavelength of 9100.00 nm with the beam diffracted into Order 1. The phase function correlates the optical path difference (OPD) with the distance Y from the surface vertex according to the equation:

$$OPD = -0.612 \times 10^{-3} Y^2 - 0.282 \times 10^{-6} Y^4$$

Figure 2:
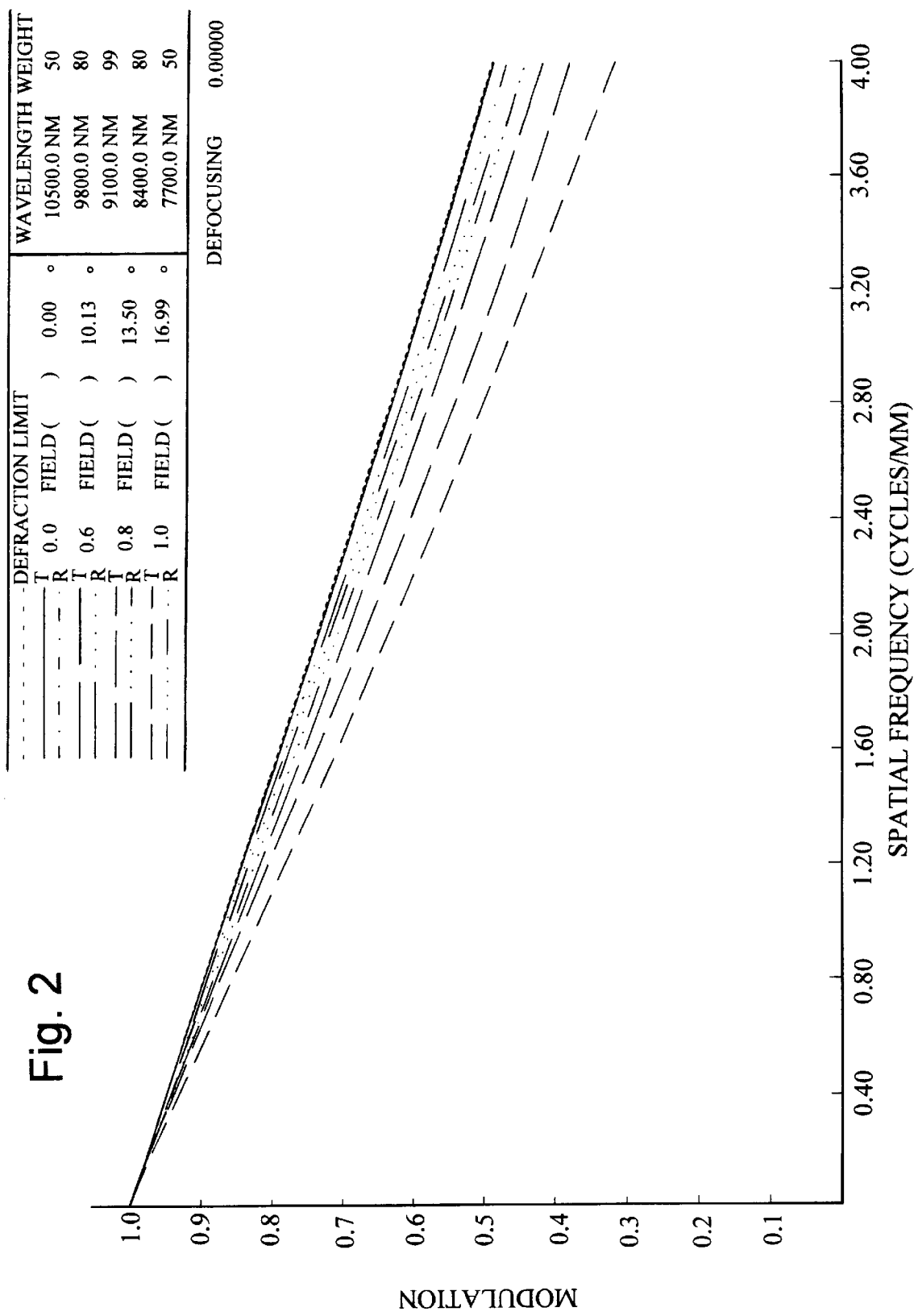
FIG. 2 illustrates image quality characteristics for the FIG. 1 telescope.
Figure 3:
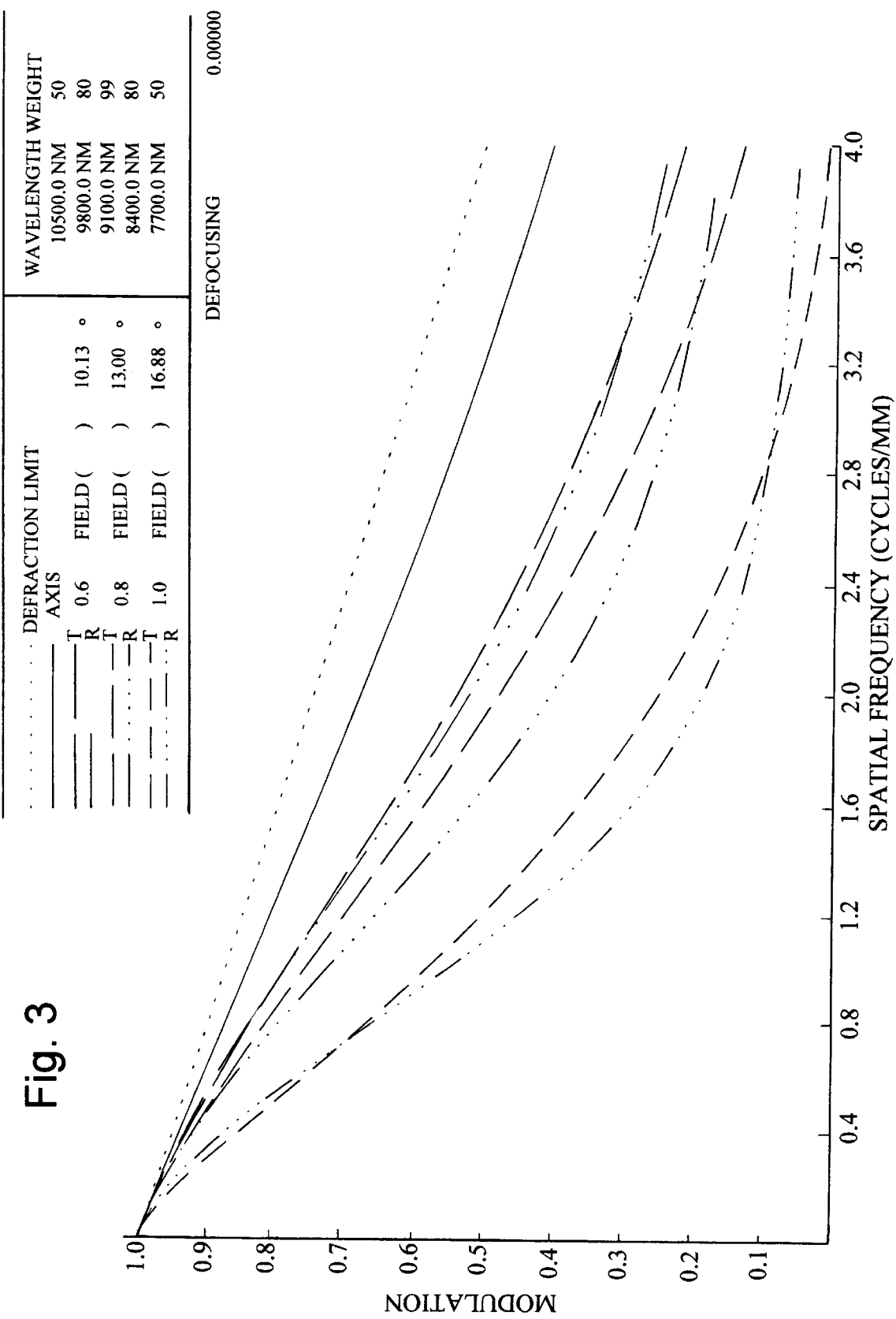
FIG. 3 illustrates comparative image quality characteristics for a prior art afocal telescope.

The telescope 20 having the parameters set forth in Table I has a magnification of 0.65 and a field of view at pupil A of about 27° horizontally by 20° vertically and provides good imaging quality for all points in the field of view such that the performance approaches the maximum permitted by diffraction limiting for both axial and off-axis rays as is shown in FIG. 2 for spacial frequencies up to 67% of cut-off. By way of comparison FIG. 3 shows the comparative characteristics of a typical prior art afocal infra-red telescope. FIGS. 2 and 3 are conventional Modulation Transfer Function (MTF) plots for the zero defocussing condition at four field angles on a wavelength-weighted basis.

Furthermore the telescope 20 is comparatively easy to manufacture. It has a low optical gain on all surfaces and the intermediate image D is well separated from the adjacent optical elements, which is generally desirable since it facilitates use of a temperature reference device for the scanner.

When the telescope is used with a scanning system it is also possible to correct residual scanner athermalisation errors by small alterations to the lens powers.

| | Curv | K | α | β | γ |
|---|---|---|---|---|---|
| A-1: | 0.02308937 | 0.0000 | $-0.9 \times 10^{-6}$ | $-0.49 \times 10^{-9}$ | 0.0000 |
| X-1: | -0.02767783 | 0.0000 | $0.193 \times 10^{-5}$ | 0.0000 | $0.34 \times 10^{-11}$ |

I claim:

1. An afocal telescope capable of operating in the thermal infra-red waveband, the telescope comprising a three-element objective for receiving radiation from object space and a two-element eyepiece for delivering image-forming radiation to an exit pupil, the eyepiece and objective being aligned on a common optical axis and arranged such that an intermediate image is formed between the objective and the eyepiece, wherein the three-element objective comprises a positively-powered central lens element disposed between positively powered and negatively powered lateral lens elements, the negatively powered lateral lens element being located proximal to object space, the positively powered lateral lens element being located proximal to the intermediate image and incorporating a hybrid surface simultaneously to correct longitudinal and field colour, and wherein one of the positively powered lens element s of the objective is made of a material having a negative temperature refractive index co-efficient and has an optical power selected to render the telescope athermal.

2. An afocal telescope as claimed in claim 1 wherein the negative temperature refractive index co-efficient lens element is the central lens element of the objective, the refractive surfaces of which are spherical to simplify manufacture.

3. An afocal telescope as claimed in claim 1, wherein the positively powered lateral lens element incorporating the hybrid surface is made of any one of the materials: zinc selenide, germanium and chalcognenide.

TABLE I

| ITEM | | SURFACE DESCRIPTION | | | | |
|---|---|---|---|---|---|---|
| NO | MATERIAL | NO | RADIUS | SHAPE | SEPARATION | APERTURE |
| A | AIR | | INF | PLANE | 00.00 | 13.4 |
| B | Ge | 1 | -30.046CC | SPH | 24.00 | 29.5 |
| | | 2 | -32.429CX | SPH | 3.00 | 32 |
| C | Ge | 3 | 43.310CX | ASPH.A-1 | 0.50 | 38 |
| | | 4 | 80.723CC | SPH | 4.10 | 37 |
| E | ZnSe | 5 | -155.669CC | SPH | 51.77 | 29.5 |
| | | 6 | -36.130CX | HYB.X-1 | 5.00 | 30.5 |
| F | KRS5 | 7 | 16.534CX | SPH | 19.49 | 18.5 |
| | | 8 | 20.410CC | SPH | 4.50 | 15.5 |
| G | ZnSe | 9 | -9.594CC | SPH | 16.61 | 15 |
| | | 10 | -16.534CX | SPH | 4.82 | 21 |

Aspheric Formula $$Z = \frac{(CURV) Y^2}{1 - \sqrt{(1 - (1+K)(CURV)^2 \cdot Y^2)}} + \alpha Y^4 + \beta Y^6 + \gamma Y^8$$

where z=surface sag; CURV=Radius$^{-1}$; Y is the distance from the surface vertex; and k, α, β, and γ and are parameters given by:

4. An afocal telescope as claimed in claim 1, wherein the negative temperature refractive index co-efficient material is Thallium Bromo-Iodide (also known as KRS5).

5. An afocal telescope as claimed in claim 1, wherein the lens elements of the eyepiece are made of any one of the materials: Germanium and Gallium Arsenide.

6. An afocal telescope as claimed in claim 1 and having parameters, as follow:

| ITEM | MATERIAL | SURFACE DESCRIPTION | | | | |
|---|---|---|---|---|---|---|
| | | NO | RADIUS | SHAPE | SEPARATION | APERTURE |
| Exit Pupil (A) | AIR | | INF | PLANE | 00.00 | 13.4 |
| Eyepiece Lens Element (B) | Ge | (1) | −30.046CC | SPH | 24.00 | 29.5 |
| | | (2) | −32.429CX | SPH | 3.00 | 32 |
| Eyepiece Lens Element (C) | Ge | (3) | 43.310CX | ASPH.A-1 | 0.50 | 38 |
| | | (4) | 80.723CC | SPH | 4.10 | 37 |
| Ojective Lens Element (E) | ZnSe | (5) | −155.669CC | SPH | 51.77 | 29.5 |
| | | (6) | −36.130CX | HYB.X-1 | 5.00 | 30.5 |
| Objective Central Lens Element (F) | KRS5 | (7) | 16.534CX | SPH | 19.49 | 18.5 |
| | | (8) | 20.410CC | SPH | 4.50 | 15.5 |
| Objective Lens Element (G) | ZnSe | (9) | −9.594CC | SPH | 16.61 | 15 |
| | | (10) | −16.534CX | SPH | 4.82 | 21 |

Where all dimensions are in millimetres; CC indicates concave; CX indicates convex; SPH indicates spherical; ASPH.A-1 indicates aspherical according to formula A-1; HYB.X-1 indicates a surface relief hologram formed on an aspherical surface according to formula X-1; 'separation' indicates distance from the previous surface; and 'aperture' indicates diametrical size, Aspheric Formula $$Z = \frac{(CURV)Y^2}{1 - \sqrt{(1-(1+K)(CURV)^2 \cdot Y^2)}} + \alpha Y^4 + \beta Y^6 + \gamma Y^8$$

where Z=surface sag; CURV=Radius$^{-1}$; Y is the distance from the surface vertex; and K, $\alpha$, $\beta$, and $\gamma$ are parameters given by:

| | Curv | K | $\alpha$ | $\beta$ | $\gamma$ |
|---|---|---|---|---|---|
| A-1: | 0.02308937 | 0.0000 | −0.9 × 10$^{-6}$ | −0.49 × 10$^{-9}$ | 0.0000 |
| X-1: | 0.02767783 | 0.0000 | 0.193 × 10$^{-6}$ | 0.0000 | 0.34 × 10$^{-11}$ |

* * * * *